United States Patent [19]
Rahamim et al.

[11] Patent Number: 6,061,445
[45] Date of Patent: May 9, 2000

[54] SURGE PROTECTION DATA ACCESS ARRANGEMENT (DAA)

[75] Inventors: Raphael Rahamim, Orange; Brian D. Stroud, Santa Ana, both of Calif.

[73] Assignee: Conexant Systems, Inc., Newport Beach, Calif.

[21] Appl. No.: 08/929,960

[22] Filed: Sep. 15, 1997

[51] Int. Cl.[7] .............................. H04M 11/00; H02H 9/00
[52] U.S. Cl. .......................... 379/412; 379/377; 379/399; 361/119
[58] Field of Search .................................. 379/412, 93.05, 379/27, 93.06, 93.26, 93.28, 399, 405, 413; 361/119, 93, 100, 102, 56, 96, 60

[56] References Cited

U.S. PATENT DOCUMENTS

| | | | |
|---|---|---|---|
| 4,440,980 | 4/1984 | Bakker | 379/412 |
| 4,447,674 | 5/1984 | Grantland et al. | 379/190 |
| 4,456,940 | 6/1984 | Hammerberg et al. | 361/56 |
| 4,644,437 | 2/1987 | Robe | 361/56 |
| 4,715,058 | 12/1987 | Lechner et al. | 379/27 |
| 4,876,620 | 10/1989 | Borkowicz | 361/56 |
| 4,991,051 | 2/1991 | Hung | 361/119 |
| 5,243,488 | 9/1993 | Bernier et al. | 361/56 |
| 5,315,651 | 5/1994 | Rahamin et al. | 379/412 |
| 5,490,215 | 2/1996 | Pelegris | 379/412 |
| 5,532,898 | 7/1996 | Price | 361/119 |
| 5,596,470 | 1/1997 | Urbigkeit | 361/191 |
| 5,677,820 | 10/1997 | Pelegris | 361/119 |
| 5,696,660 | 12/1997 | Price | 361/119 |
| 5,726,853 | 3/1998 | Chavannes | 361/119 |
| 5,777,836 | 7/1998 | Price et al. | 361/94 |
| 5,802,151 | 9/1998 | Bevill, Jr. et al. | 379/93.05 |
| 5,901,210 | 5/1999 | Schley-May | 379/142 |

*Primary Examiner*—Forester W. Isen
*Assistant Examiner*—Jacques Saint-Surin
*Attorney, Agent, or Firm*—Price Gess & Ubell

[57] ABSTRACT

An improved surge protection circuit for withstanding surges is provided. A first node is provided for coupling to a tip lead, and second node is provided for coupling to a ring lead. The surge protection circuit has a first current path for turning on a first transistor, and a second current path for redirecting current from the remaining excess surge energy from one lead to the other lead. The first current path further includes a first sub-path to direct the initial voltage surge to the base electrode of the first transistor to cause the first transistor to turn on hard. The second sub-path redirects current from the initial excess surge energy from the voltage surge to a capacitor prior to the time before the first transistor is fully turned on, so as to protect the base-emitter junction of a second transistor from being reverse biased. The second current path according to the present invention includes the first transistor and a resistor having a first terminal coupled to the emitter electrode of the first transistor and a second terminal coupled to the second node. When the first transistor is fully turned on, the remaining excess voltage is redirected from the tip ring to the lead ring to protect the other circuit elements from damage. A third current path is provided for directing current during an over-voltage condition from one lead to the other lead.

23 Claims, 3 Drawing Sheets

SURGE PROTECTION DATA ACCESS ARRANGEMENT (DAA)

BACKGROUND OF THE INVENTION

1. Field of the Invention

The present invention relates generally to the field of protective circuit arrangements for protecting circuit elements connected to a telephone line against the damaging effects of transient abnormal high voltage surges on the telephone line, and particularly, to an improved surge protection Data Access Arrangement (DM) for protecting against surges.

2. Background Art

The Underwriter Laboratory (UL) and the Federal Communications Commission (FCC) require devices that are connected to the public switched telephone network (PSTN), such as modems, to conform to specific rules. For example, UL standard UL 1459 and FCC part 68 set forth requirements for devices that interface to the PSTN.

The FCC requirements include tests where a voltage and current are applied to a device under test (also commonly known as a unit under test). The tests are designed to determine how well the tested device protects against the applied voltage and current (also referred to hereinafter as a surge).

In the FCC tests, an important protection criteria is commonly referred to as "metallic" or "differential mode" protection. Metallic protection is measured across the ring lead and tip lead of the telephone line.

Furthermore, the FCC tests can specify one of two compliance standards: an operational compliance standard (also known as a "non-destructive" compliance standard) and a non-operational compliance standard (also known as a "destructive" compliance standard). If the test specifies an operational compliance standard, the device under test must be operational after the test to pass the test. If the test specifies a non-operational compliance standard, the device under test can be non-operational after the test and still pass the test, as long as it meets certain impedance criteria.

Presently, the FCC requires all devices that are connected to the telephone network to pass a metallic voltage surge test. This metallic voltage surge test applies a 800V, 100A surge to the device under test to simulate a lightning strike. Since this is a metallic test, the surge is applied between the tip and ring (T&R) leads of a unit under test, such as a modem. The present metallic voltage surge test also specifies a non-operational compliance standard so that the unit under test passes the test even if the device is no longer operational after the test.

There are two conventional approaches to address the present metallic voltage surge test. The first approach employs a fuse or a fuse-like link, such as coils and resistors, to protect against the surge. The fuses or fuse-like links blow open whenever high currents flow through them. Once these fuses or fuse-like links are blown, the modem is inoperable. However, since the present metallic voltage surge test specifies a non-operational compliance standard, these devices would still pass the test.

The second approach employs an energy absorbing device, such as spark gaps, metal oxide variable resistors (MOVs), and SIDACTORS™ (manufactured by Teccor Electronics, Inc.), to absorb the surge.

The FCC is in the process of approving a new additional metallic voltage surge test that specifies an operational compliance standard. This new test applies a 1KV, 25A surge to the tip and ring leads of the device under test. In order to pass this test, the device must remain operational after the test.

Consequently, the prior art protection circuits that employ fuse-like links are inadequate to pass this new test because these circuits are not operational after the test. In addition, the prior art protection circuits that employ fuses or fuse-like links are not reliable since the fuses or fuse-like links may blow during normal operation when the unit is not undergoing a test surge. In other words, the fuses or fuse-like links may be sensitive to surges experienced during normal operation.

The prior art protection circuits that employ fuses or fuse-like links are also disadvantageous because of the 18-ohm resistors (connected in series with the tip and ring leads) that are typically provided with such circuits for surge protection. Under normal operation, the tip and ring resistors degrade modem signals by inducing a loss in energy. For example, to get a −10dBm output at tip and ring, the controller needs to transmit a −9dBm signal. This causes the controller to consume more energy than it really needs to in order to transmit a higher signal, and also causes the controller to be closer to saturation or distortion levels. These tip and ring resistors also render the overall circuit bulkier and more expensive.

In addition, the prior art protection circuits that employ fuses or fuse-like links compromise product reliability because voltage surges of less than, for example, 400 Volts but greater than, for example, about 150 Volts can cause the modem's tip and ring resistors to open up and disable the modem, just as if a large lightning strike had actually hit the wires leading to the modem. Therefore, since the energy absorbing device will protect the circuit against large voltage spikes only, the smaller spikes may still damage the circuit.

The prior art protection circuits that employ surge energy absorbing devices alone may not be sufficient to pass the new FCC test. Surge energy absorbing devices may fail the new FCC test because they are over-voltage devices, which means that they will not absorb the smaller voltage surges that may actually damage the circuit.

Accordingly, there remains a need for an improved surge protection circuit that passes the new FCC 1KV, 25A, non-destructive, surge test by ensuring that the unit under test is operational after the test, while providing an improved surge protection circuit that reduces the number of component parts, allows for higher integration, reduces the cost of the device, and maximizes the reliability of the device.

SUMMARY OF THE INVENTION

In order to accomplish the objects of the present invention, there is provided an improved surge protection circuit for withstanding surges. A first node is provided for coupling to a tip lead, and second node is provided for coupling to a ring lead. The surge protection circuit has a first current path for turning on a first transistor, and a second current path for redirecting current from the remaining excess surge energy from one lead to the other lead.

In one embodiment of the present invention, the first current path further includes a first sub-path and a second sub-path. The first sub-path includes a zener diode coupled to the first transistor to direct the voltage surge to the base electrode of the first transistor to cause the first transistor to turn on hard. The second sub-path includes the zener diode, a second diode having an anode coupled to the zener diode's anode, a resistor having a first terminal coupled to the second diode's cathode, and a capacitor having a first terminal coupled to the resistor's second terminal, and a second terminal coupled to the second node. The second sub-path redirects current from the initial excess surge energy to the capacitor prior to the time before the first transistor is fully turned on. The surge protection circuit of the present invention further includes a second transistor having a base electrode coupled to the second diode's cathode, a collector electrode coupled to the first node, and an emitter electrode coupled to the base electrode of the first transistor. The second sub-path redirects the current from the initial excess surge energy to protect the base-emitter junction of second transistor from being reverse biased.

The second current path according to the present invention includes the first transistor and a resistor having a first terminal coupled to the emitter electrode of the first transistor and a second terminal coupled to the second node. When the first transistor is fully turned on, the current from the remaining excess voltage is redirected from the tip ring to the lead ring to protect the other circuit elements from damage.

The surge protection circuit of the present invention further includes an over-voltage protection circuit having a first terminal coupled to the first node and a second terminal coupled to the second node for absorbing excess surge energy. The over-voltage protection circuit creates a third current path during an over-voltage condition, and absorbs remaining excess voltage over a certain voltage level.

Thus, the present invention provides a surge protection circuit that can withstand repeated simulated lightning strikes and pass the new FCC 1KV, 25A metallic, non-destructive surge test and remain operational after the test. The surge protection circuit of the present invention provides protection against such surges without degrading the performance of the unit under test, while increasing product (e.g., modem) reliability and minimizing the size and cost of the existing product that must pass the new FCC test, and allowing for higher integration.

The surge protection circuit according to the present invention can be implemented without the conventional tip and ring 18-ohm resistors. Removal of these resistors improves the output quality of the product.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

In the following description, for purposes of explanation and not limitation, specific details are set forth in order to provide a thorough understanding of the present invention. However, it will be apparent to one skilled in the art that the present invention may be practiced in other embodiments that depart from these specific details. In certain instances, detailed descriptions of well-known, devices and circuits are omitted so as to not obscure the description of the present invention with unnecessary detail.

Figure 1:
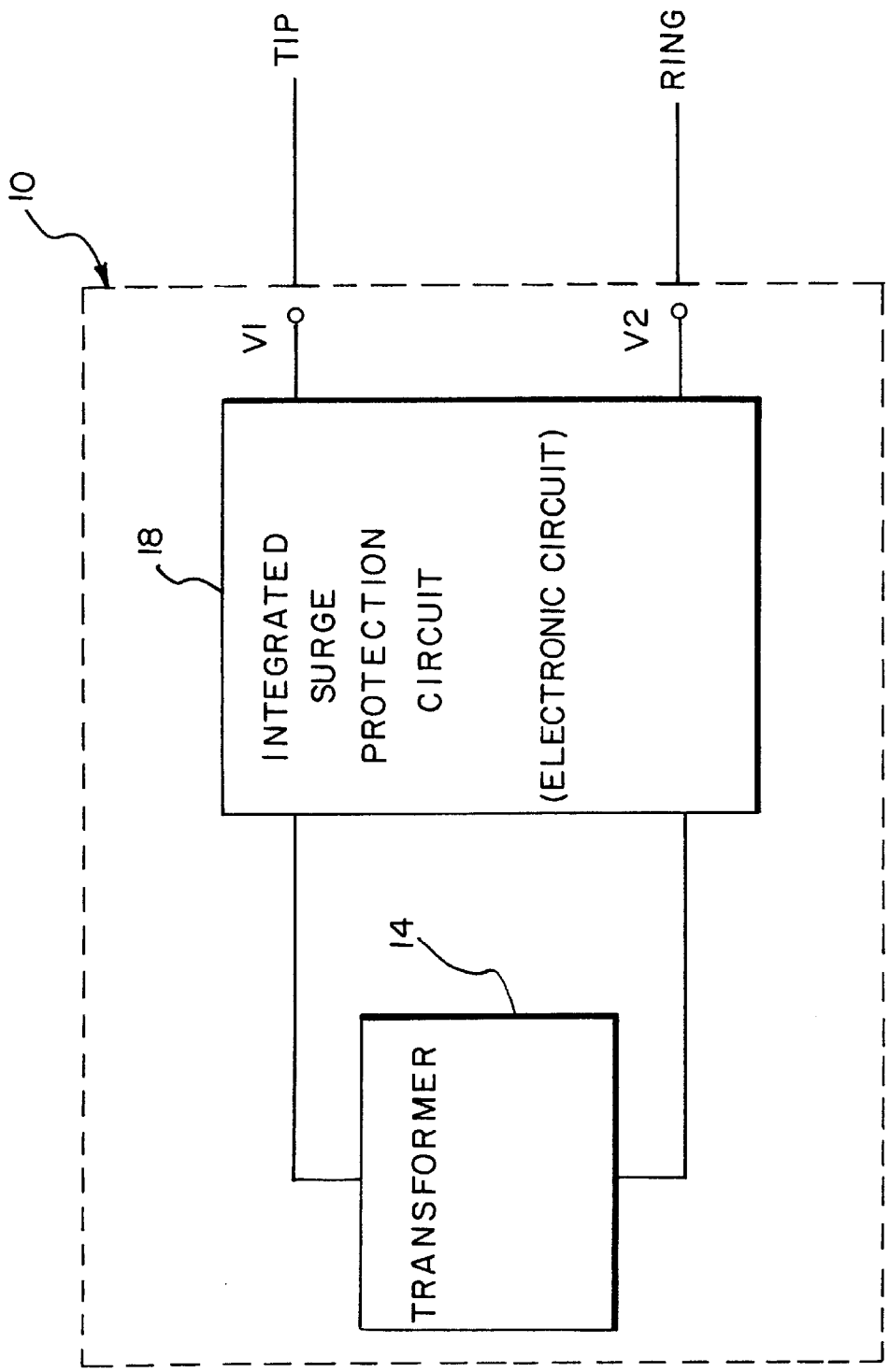
FIG. 1 is a simplified block diagram illustrating an electronic device incorporating the surge protection circuit of the present invention.

FIG. 1 is a simplified block diagram illustrating an electronic device 10 incorporating the integrated surge protection circuit 18 (also referred to as a Data Access Arrangement (DAA)) of the present invention. The electronic device 10 can be any device that is adapted to connect to telephone lines. For example, the electronic device 10 can be, but is not limited to, a modem, a router, a bridge, and any equipment adapted to be connected to a phone line, such as phone and related circuits. The electronic device 10 includes a first port for coupling to a tip lead and a second port for coupling to a ring lead. The tip and ring leads are employed to communicate data between the electronic device 10 and a telephone line in the public switched telephone network (PSTN). The electronic device 10 includes an electronic circuit that needs protection from high level, fast rising voltage surges from the telephone line. The electronic circuit performs the functions of the respective electronic device 10.

The electronic device 10 includes an integrated surge protection circuit 18. The integrated surge protection circuit 18 of the present invention includes the electronic circuit to be protected, a first node V1 for coupling to a tip lead, and a second node V2 for coupling to a ring lead. The integrated surge protection circuit is 18 is also coupled to a transformer 14. As a non-limiting example, the integrated surge protection circuit 18 of the present invention can be used with the RCV56ACF in the AK56-D120-181 modem accelerator kit, which is manufactured by the assignee of the present application.

Figure 2:
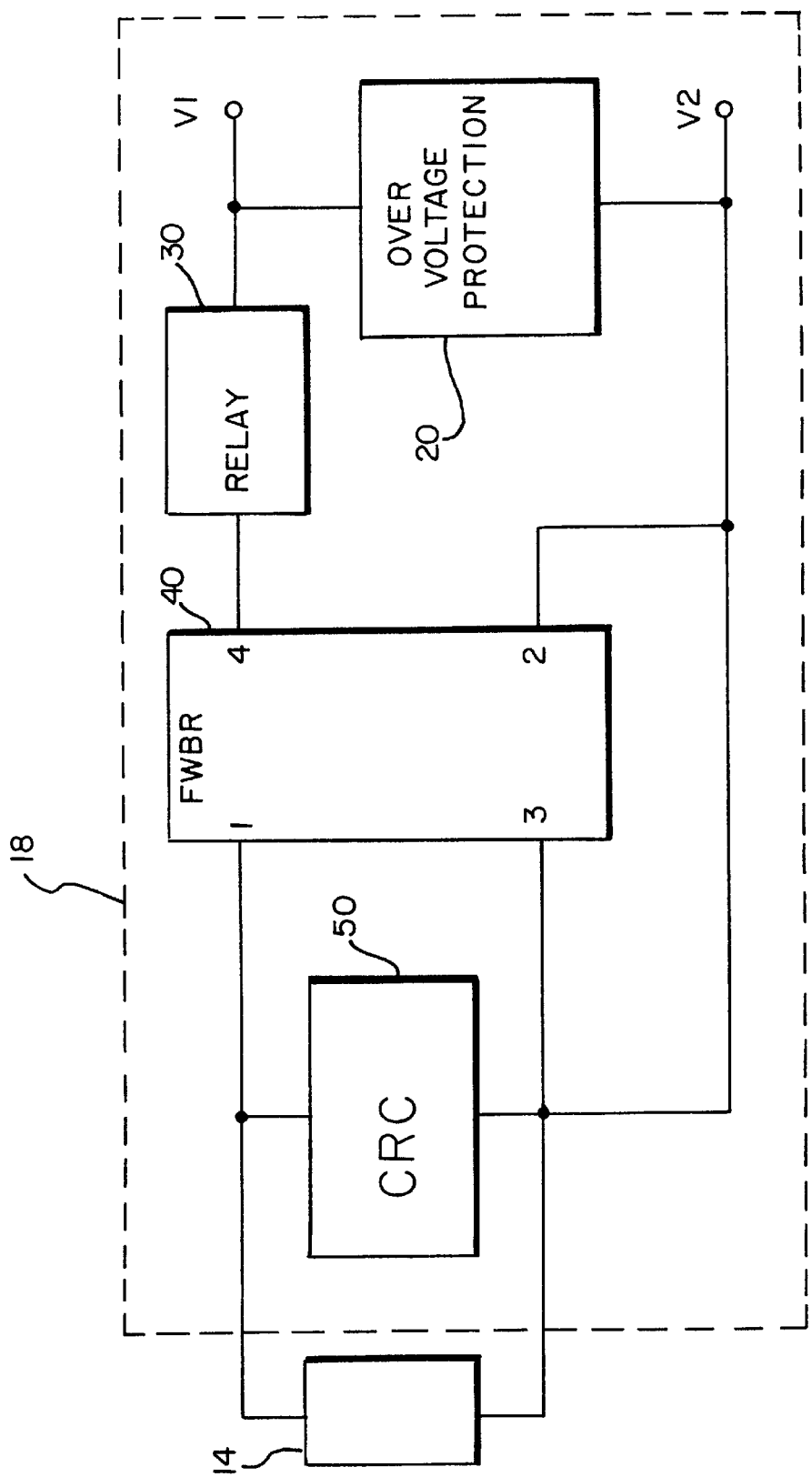
FIG. 2 is a block diagram illustrating in greater detail the surge protection circuit of the present invention.

FIG. 2 is a block diagram illustrating in greater detail the integrated surge protection circuit 18 of the present invention. The integrated surge protection circuit 18 includes an over-voltage protection circuit 20 that absorbs large voltage spikes greater than a certain voltage, for example 400 Volts.

The integrated surge protection circuit 18 further includes a relay 30 having a first terminal coupled to node V1 and a second terminal coupled to a full bridge wave rectifier 40, described hereinafter. The relay 30 is employed to place the device 10 into either an ON-HOOK state or OFF-HOOK state. When in the ON-HOOK state, the relay 30 is OFF (i.e., the contacts are open), and the surge is electrically isolated from the electronic circuits 14. Consequently, the electronic circuit 14 is not in danger of being damaged when in the ON-HOOK state. When in the OFF-HOOK state, the relay 30 is ON (i.e., the contacts are closed), and the surge can cause irreversible damage to the electronic circuit if the integrated surge protection circuit 18 of the present invention were not provided.

The integrated surge protection circuit 18 further includes a full wave bridge rectifier 40. The full wave bridge rectifier 40 includes first and third terminals coupled to a current redirection circuit 50, a second terminal coupled to node V2, and a fourth terminal coupled to the second terminal of the relay 30. The full wave bridge rectifier 40 performs rectification of a received AC signal and generates a DC signal.

The current redirection circuit (CRC) 50 is coupled to the full wave bridge rectifier 40 and the ring lead node V2, and operates to redirect current from the excess voltage spike to the opposite lead and away from particular circuit elements to protect these circuit elements from damage caused by the voltage spike. In addition, the CRC 50 functions to hold DC loop current during normal (non-surge) operation of the DAA.

Figure 3:
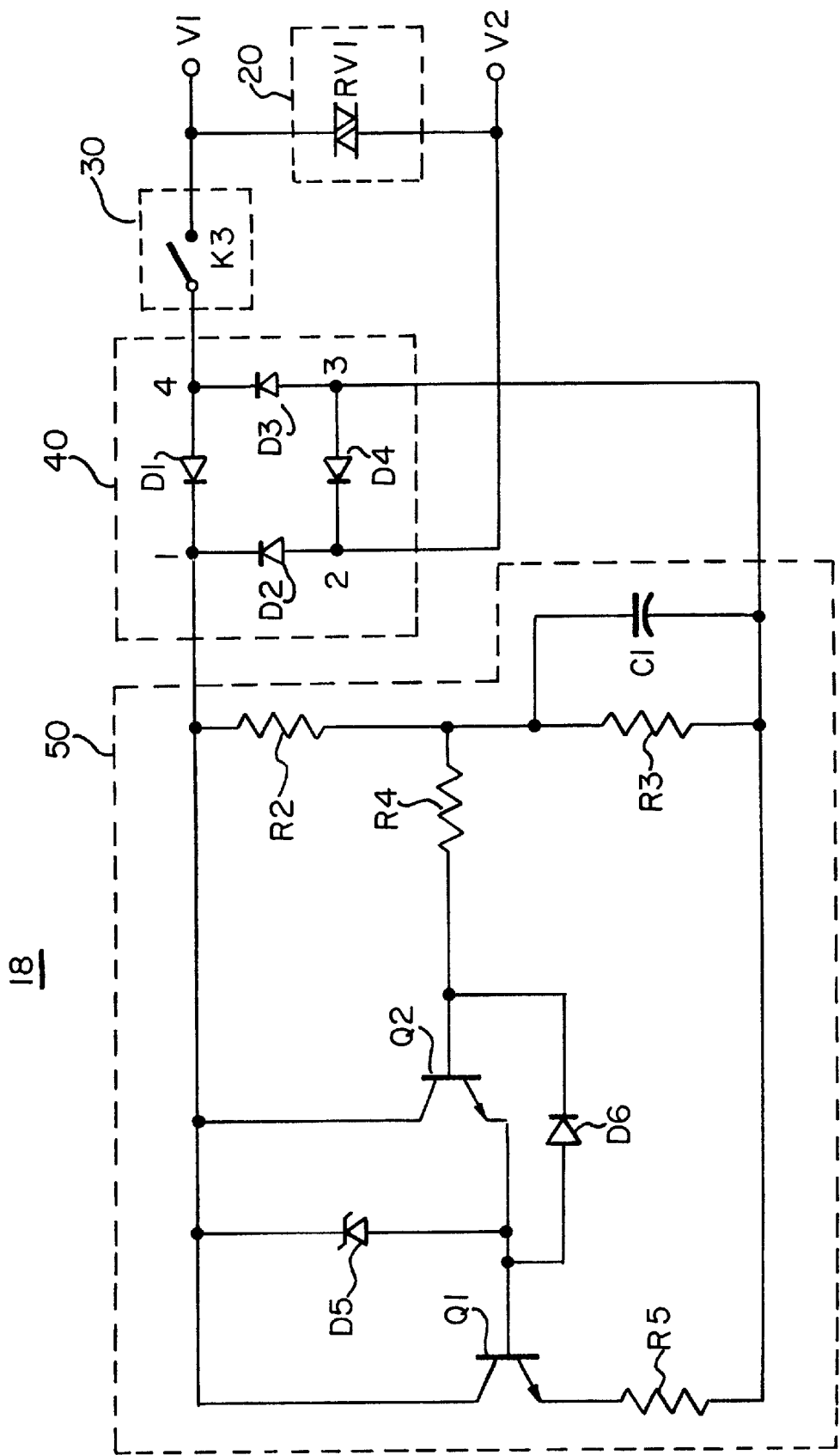
FIG. 3 is a schematic diagram of a preferred embodiment of the surge protection circuit of the present invention.

FIG. 3 is a schematic diagram of a preferred embodiment of the integrated 1surge protection circuit 18 of the present invention. In the preferred embodiment of the present invention, the over-voltage protection circuit 20 is implemented by an over-voltage device RV1 that protects against over-voltage. RV1 can be a SIDACTOR™, such as a P3100EA70 manufactured by Teccor Electronics, Inc. The over-voltage protection device (RV1) clamps the voltage across its leads to a particular voltage, for example 400 Volts. RV1 is rated to handle a peak surge current of, for example, 125 Amps. Although the present invention employs specific over-voltage (SIDACTOR™) devices, other over-voltage devices that act as voltage controlled switches, such as MOVs, or a pair of zener diodes positioned across the tip and ring leads, which are known in the art, can be used to practice the present invention.

The relay 30 can be implemented with a mechanical relay K3, although FETs, bipolar transistors, or electronic relays can also be used. The full wave bridge rectifier 40 includes four diodes (D1, D2, D3, and D4) to ensure that the voltage at its first terminal is positive and that the voltage at its third terminal is negative. The diodes can be 1N4004 and SM4004 diodes, or diodes of a larger reverse bias value. In general, any diode configuration with a greater than 400 Volt reverse bias and an 8 Amp (single pulsed) capability can be used for the full wave bridge rectifier 40. As a further non-limiting alternative, the full wave bridge rectifier 40 can be provided in the form of a semiconductor single chip rectifier.

The CRC 50 includes a zener diode D5, a diode D6, two transistors (Q1 and Q2), a resistive-capacitive network (R2, R3, R4, and C1), and a resistor R5. The zener diode D5 has a cathode coupled to the first terminal of the rectifier 40. The diode D6 has an anode coupled to the anode of zener diode D5 and a cathode coupled to a first terminal of resistor R4, which has a second terminal coupled to the first terminals of resistors R2 and R3 (operating as a voltage divider), as well as the first terminal of the capacitor C1. The resistors R2 and R3 have second terminals coupled to terminal 1 of the rectifier 40 and node V2, respectively, and the capacitor C1 has a second terminal coupled to node V2. The transistor Q1 has a collector electrode coupled to the first terminal of the rectifier 40, a base electrode coupled to the anode of the zener diode D5 and the emitter electrode of the transistor Q2, and an emitter electrode coupled to a first terminal of resistor R5. Resistor R5 has a second terminal coupled to node V2. The transistor Q2 has a base electrode coupled to the cathode of diode D6, a collector electrode coupled to the first terminal of the rectifier 40, and an emitter electrode coupled to the anodes of zener diode D5 and diode D6, and the base electrode of transistor Q1.

The circuit elements that operate to provide the surge protection are the zener diode D5, the diode D6, and the resistor R4. These elements D5, D6 and R4 operate together with the other circuit elements in the CRC 50 to redirect the current from the voltage surge, and can be omitted if surge protection is not necessary. In other words, these elements D5, D6 and R4 are not needed during normal operation of the DAA.

In this regard, resistor R5 is preferably a larger resistor (i.e., a heavy duty through hole resistor) providing greater resistance. In a non-limiting example, resistor R5 is a 51-ohm resistor. Resistor R4 is preferably a heavy duty through hole resistor. Resistors R2 and R3 are preferably light duty through hole or SMT resistors. Zener diode D5 is preferably a 11–17 Volt zener diode. The transistors Q1 and Q2 can be replaced or substituted by FETs.

During normal operation, the relay 30 is turned on to place the modem in the OFF-HOOK state. The transistor Q2 operates to regulate the base current of transistor Q1.

When a voltage surge is experienced, the CRC 50 operates to redirect current from the excess voltage surge to the opposite lead. The CRC 50 performs this function by creating two current paths. The first current path actually includes two sub-paths. The first sub-path is formed by zener diode D5 and transistor Q1, and the second sub-path is formed by zener diode D5, diode D6, resistor R4, and capacitor C1 in series. The second current path is formed by transistor Q1 and resistor R5. Zener diode D5 is provided to cause transistor Q1 to turn on hard. To do so, the zener diode D5 essentially creates a "short" between the first terminal of the rectifier 40 and the base electrode of the transistor Q1, thereby bypassing transistor Q2 which controls transistor Q1. This is the first sub-path of the first current path. Once transistor Q1 has reached saturation mode, the excess voltage from rectifier 40 is absorbed by the resistor R5 and its current redirected to the ring lead.

However, before transistor Q1 becomes fully saturated (i.e., fully ON), it is necessary to protect the base-emitter junction of transistor Q2 from being reverse biased by the initial excess voltage surge received via zener diode D5, since transistor Q2 will fail because the base-emitter junction will be subjected to a reverse bias in excess of its maximum tolerable 5V–6V breakdown voltage. This is accomplished by providing the diode D6, which clamps the base potential to approximately 0.7 volts lower than the emitter potential. Diode D6 directs the current from zener diode D5 to the resistor R4 and capacitor C1. This forms the second sub-path of the first current path. In other words, diode D6 creates a "short" in the CRC 50 that essentially removes transistor Q2 from the circuit of the CRC 50 during surge conditions.

The operation of the integrated surge protection circuit 18 will now be described. When the relay 30 is closed, a loop current flows through K3 and the bridge rectifier 40, and crosses the voltage divider R2–R3 to the transistor Q2 which regulates the base current of the transistor Q1. When a surge is applied between the tip and ring leads, the zener diode D5 becomes reversed biased and current flows through the first current path. The current flowing through the first sub-path will cause the transistor Q1 to turn on hard, while the current flowing through the second sub-path will direct the current from the initial excess voltage surge away from the transistor Q2 until the transistor Q1 becomes fully saturated. When transistor Q1 is fully ON, the current flows through the second current path, so that the remaining excess surge energy is absorbed by resistor R5 and its current redirected to the ring lead until the voltage surge reaches a particular voltage, such as 400 Volts, when the over-voltage protection circuit 20 begins to absorb the excess voltage. The operation of the over-voltage protection circuit 20 essentially forms a third current path. Thus, the first and second current paths operate during an "under-voltage" condition, and the third current path comes into effect during an "over-voltage" condition.

The integrated surge protection circuit 18 of the present invention also obviates the conventional tip and ring resistors that are found in typical DAAs. One reason that these tip and ring resistors are not needed in the present invention is that the integrated surge protection circuit 18, namely resistor R5, provides adequate resistance.

The integrated surge protection circuit 18 of the present invention provides the following advantages. First, the integrated surge protection circuit 18 increases product (e.g., modem) reliability. Second, the integrated surge protection circuit 18 minimizes the size and cost of the existing product that must pass the new FCC test. Third, the integrated surge protection circuit 18 improves the product's output by eliminating the conventional tip and ring resistors. By eliminating the tip and ring resistors, the controller of the product does not need to calculate and compensate for the loss in energy induced by these resistors, and overall performance is improved. Fourth, the surge protection circuit 18 employs many of the existing DAA devices so that upgrading a product is simplified.

While the invention has been described in conjunction with a specific embodiment, it is evident that many alternatives, modifications, and variations will become apparent to those skilled in the art in light of the foregoing description. For example, although the present invention has been described as being part of a modem, the present invention can be used as easily with other electronic devices that interconnect to telephone lines such as routers and bridges. It will be recognized that the above described invention may be embodied in other specific forms without departing from the spirit or essential characteristics of the disclosure. Thus, it is understood that the invention is not to be limited by the foregoing illustrative details, but rather is to be defined by the appended claims.

What is claimed is:

1. A surge protection circuit, comprising:
    a first node for coupling to a tip lead;
    a second node for coupling to a ring lead;
    a first transistor;
    a first current path including:
        a first sub-path for turning on the first transistor, and a second sub-path for redirecting current from the initial excess surge energy prior to the time when the first transistor is fully turned on; and
        a second current path for redirecting current from the excess surge energy from one lead to the other lead.

2. The surge protection circuit of claim 1, wherein the first transistor includes a base electrode, a collector electrode, and an emitter electrode, and wherein the first sub-path includes a zener diode and the first transistor, the zener diode having a cathode coupled to the first node and an anode coupled to the base electrode of the first transistor.

3. The surge protection circuit of claim 1, wherein the second sub-path includes:
    (a) a zener diode having a cathode and an anode;
    (b) a second diode having an anode coupled to the zener diode's anode, and a cathode;
    (c) a resistor having a first terminal coupled to the second diode's cathode, and a second terminal; and
    (d) a capacitor having a first terminal coupled to the resistor's second terminal, and a second terminal coupled to the second node.

4. The surge protection circuit of claim 3, further including a second transistor having a base electrode coupled to the second diode's cathode, a collector electrode coupled to the first node, and an emitter electrode coupled to the base electrode of the first transistor.

5. The surge protection circuit of claim 1, wherein the first transistor includes a base electrode, a collector electrode, and an emitter electrode, and wherein the second current path includes the first transistor and a resistor having a first terminal coupled to the emitter electrode of the first transistor and a second terminal coupled to the second node.

6. The surge protection circuit of claim 1, further comprising an over-voltage protection circuit having a first terminal coupled to the first node and a second terminal coupled to the second node for absorbing excess surge energy.

7. The surge protection circuit of claim 6, wherein the over-voltage protection circuit comprises a SIDACTOR™.

8. The surge protection circuit of claim 6, further comprising a full wave bridge rectifier having first and third terminals coupled to the first and second current paths, a second terminal coupled to the second node, and a fourth terminal coupled to the first node.

9. The surge protection circuit of claim 8, further comprising a relay having a first terminal coupled to the rectifier's fourth terminal and a second terminal coupled to the first node.

10. A modem adapted to be coupled to a tip lead and a ring lead, comprising:
    a first node for coupling to a tip lead;
    a second node for coupling to a ring lead;
    a surge protection circuit including:
        first transistor;
        a first current path including;
            a first sub-path for turning on the first transistor, and a second sub-path for redirecting current from the initial excess surge energy prior to the time when the first transistor is fully turned on; and
        second current path for redirecting current from the excess surge energy from one lead to the other lead.

11. The modem of claim 10, wherein the first transistor includes a base electrode, a collector electrode, and an emitter electrode, and wherein the first sub-path includes a zener diode and the first transistor, the zener diode having a cathode coupled to the first node and an anode coupled to the base electrode of the first transistor.

12. The modem of claim 10, wherein the second sub-path includes:
    (a) a zener diode having a cathode and an anode;
    (b) a second diode having an anode coupled to the zener diode's anode, and a cathode;
    (c) a resistor having a first terminal coupled to the second diode's cathode, and a second terminal; and
    (d) a capacitor having a first terminal coupled to said resistor's second terminal, and a second terminal coupled to the second node.

13. The modem of claim 12, further including a second transistor having a base electrode coupled to the second diode's cathode, a collector electrode coupled to the first node, and an emitter electrode coupled to the base electrode of the first transistor.

14. The modem of claim 10, wherein the first transistor includes a base electrode, a collector electrode, and an emitter electrode, and wherein the second current path includes the first transistor and a resistor having a first terminal coupled to the emitter electrode of the first transistor and a second terminal coupled to the second node.

15. The modem of claim 10, further comprising an over-voltage protection circuit having a first terminal coupled to the first node and a second terminal coupled to the second node for absorbing excess surge energy.

16. A surge protection circuit for providing surge protection, the surge protection circuit having a first node for coupling to a tip lead, and a second node for coupling to a ring lead, the surge protection circuit comprising:
    (a) a first transistor having a base electrode, a collector electrode, and an emitter electrode;
    (b) a zener diode having a cathode and an anode coupled to the base electrode of the first transistor;
    (c) a first resistor having a first terminal coupled to the emitter electrode of the first transistor and a second terminal coupled to the second node;

(d) a second diode having a cathode, and an anode coupled to the first transistor's base electrode;

(e) a second transistor having a base electrode coupled to the second diode's cathode, a collector electrode coupled to the first node, and an emitter electrode coupled to the zener diode's anode, the diode's anode and the first transistor's base electrode;

(f) a second resistor having a first terminal coupled to the second transistor's base electrode, and a second terminal; and (g) a capacitor having a first terminal coupled to the second resistor's second terminal and a second terminal coupled to the second node.

17. The surge protection circuit of claim 16, further comprising a full wave rectifier having a first terminal coupled to the cathode of the zener diode, a second terminal coupled to the second node, a third terminal coupled to the second terminal of the first resistor, and a fourth terminal coupled to the first node.

18. The surge protection circuit of claim 16, further comprising an over-voltage protection circuit having a first terminal coupled to the first node and a second terminal coupled to the second node.

19. A surge protection method for protecting a device coupled to a tip lead and a ring lead, the device including a first transistor, the method comprising the steps of:

(a) providing a first path for turning on the first transistor;

(b) providing a second path for redirecting current from the initial excess surge energy prior to the time when the first transistor is fully turned on; and (c) providing a third current path for redirecting current from the excess surge energy from one lead to the other lead.

20. The method of claim 19, wherein step (a) further includes the step of providing a zener diode, a second diode, a resistor and a capacitor in series.

21. The method of claim 20, wherein step (b) further includes the step of providing the zener diode, a second diode, a resistor and a capacitor in series.

22. The method of claim 19, wherein step (c) further includes the step of providing a resistor coupled to the emitter of the first transistor.

23. The method of claim 19 further including the step of:

(d) providing a fourth current path for directing current during an over-voltage condition from one lead to the other lead.

\* \* \* \* \*